March 15, 1966 N. CANONICA, JR 3,239,956
ANIMATED MARINE DISPLAY
Filed Sept. 27, 1963
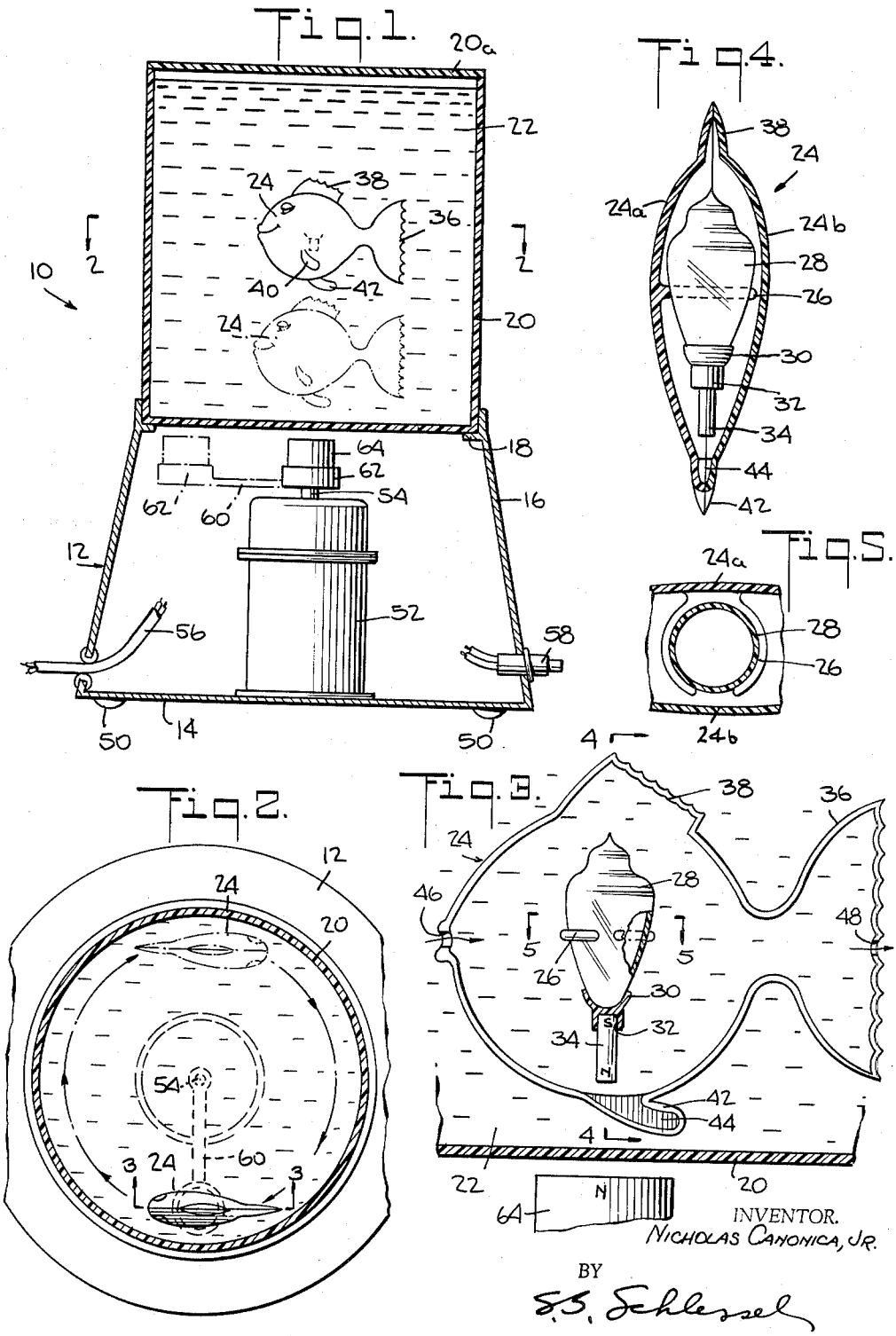
INVENTOR.
NICHOLAS CANONICA, JR.
BY
S.S. Schlessel
ATTORNEY

United States Patent Office 3,239,956
Patented Mar. 15, 1966

3,239,956
ANIMATED MARINE DISPLAY
Nicholas Canonica, Jr., 144 Utica Ave., Brooklyn 13, N.Y.
Filed Sept. 27, 1963, Ser. No. 312,150
2 Claims. (Cl. 40—106.45)

This invention relates to the field of animated marine devices, for display, advertisement and amusement, and has for its objective the creation of an object, simulating a living marine animal, such as a fish, freely suspended in a liquid medium and activated by power-driven magnetic means disposed below the liquid medium to follow a pattern of both horizontal and vertical undulating movement simulating the natural movements of a living marine animal.

In the prior state of the art frequent use has been made of magnetic attraction and repulsion for the purpose of creating movement for an inanimate object. Such movement, however, has been restricted to a single plane, such as, for example, only along either a horizontal or a vertical plane, and has generally been restricted to movement upon a surface.

The principal object of my invention, therefore, lies in the creation of an imitation marine animal, such as a toy fish, freely suspended in a liquid medium and activated by power-driven magnetic means disposed below the liquid medium to follow a continuous pattern of undulating movement through the liquid simulating the actual movements of a living marine animal of which it is a representation.

A second important object of my invention lies in the creation of an animated marine display including an imitation marine animal provided with means for its stabilization and suitable buoyancy in free suspension in a liquid medium, and for unrestricted movement through the liquid medium under magnetic impulse.

A third important object of my invention lies in the creation of an animated marine display comprising an imitation marine animal freely suspended and movable within a liquid medium, and provided with magnetic means adapted to cooperate with moving magnetic means disposed below the liquid medium to cause the imitation marine animal to follow a continuous pattern of undulating movement through the liquid medium similar to that of a live one.

These, and other salient objects, advantages and functional features of my invention, together with the novel features of construction, composition and arrangement of parts, will be more readily apparent from an examination of the following description, taken with the accompanying drawings, wherein:

FIG. 1 is a vertical cross-sectional view of a preferred embodiment of my invention;

FIG. 2 is a cross-sectional view, taken on lines 2—2 of FIG. 1;

FIG. 3 is an enlarged, cross-sectional view, taken on lines 3—3 of FIG. 2;

FIG. 4 is a cross-sectional view, taken on lines 4—4 of FIG. 3; and

FIG. 5 is a cross-sectional view, taken on lines 5—5 of FIG. 3.

Similar reference characters designate similar parts throughout the different views.

Illustrative of the embodiment shown in FIG. 1, my animated marine display 10 comprises a non-magnetic housing 12 provided with a base 14 and a peripheral wall 16. The top of the housing 12 is open and its wall 16 adjacent thereto is provided with an internal peripheral shoulder 18. A circular tank 20, as shown in FIG. 1, is seated upon, and supported by, the shoulder 18. The tank 20 may be made of glass, transparent plastic or other suitable material, and is filled with water 22. One or more imitation marine animals, such as the fish 24, is disposed within the water 22, and the tank 20 is then sealed with a lid 22a.

Each of the fish 24 is constructed, preferably, of molded plastic material made in two sections 24a and 24b, which are subsequently secured together by a water-resistant glue. Fish section 24a is provided internally with an integral, substantially circular, holder 26 extending at right angles from its mid section, and an air bulb 28 is secured within the holder 26, as shown by FIG. 4. A cap 30 is secured to the base of the bulb 28 and is provided with a pocket 32 into which one end of a permanent bar magnet 34 is secured, the magnet 34 having been magnetized so as to have its magnetic poles at its ends, as shown in FIG. 3.

The fish 24 is provided, for stabilization, with a tail, or caudal fin 36, a dorsal fin 38, pectoral fins 40 and a pelvic fin 42. Before the sections 24a and 24b are glued together, the bulb 28, with its magnet 34, are secured in place, as shown in FIGS. 3 and 4, and the pelvic fin 42 is weighted with a non-magnetic material 44, such as brass or aluminum, to give balance to the fish 24. The fish 24 is also provided with openings 46 and 48 through its mouth and caudal fin 36, as shown in FIG. 3, so that the water 22 may freely pass through the fish 24 as it moves within the tank 20.

The housing 12 is seated upon support members 50, and is internally provided with a motor 52 having a drive shaft 54, the motor 52 being centrally secured within the housing 12 so that its shaft 54 is vertically disposed toward the top of the housing 12 and the center of the base of the tank 20, the motor 52 being secured to the base 14 of the housing 12 by conventional means. The motor 52 is activated by means of a source of electric current (not shown) through the power line 56 attached thereto, and is controlled by the button switch 58. Energizing of the motor 52 causes rotation of the shaft 54 in a clockwise direction, as shown by the arrows in FIG. 2.

A non-magnetic arm 60 is secured to the shaft 54, rotatable thereby in a plane parallel to the base of the tank 20, as shown in FIG. 1. The opposite end of the arm 60 is provided with a non-magnetic pocket 62 in which there is disposed a permanent bar magnet 64 magnetized so as to have its opposite magnetic poles at the ends thereof, the magnet 64 being secured within the pocket 62 so that the magnet pole extending therefrom in the direction of the tank 20 is of the same polarity as the pole of the magnet 34 which extends downward within the fish 24. The magnet 64 is so disposed as to be rotated below the base of the tank 20 but around the internal perimeter of the tank 20, as shown in FIG. 1 and FIG. 2, with the same poles of the magnets 34 and 64 facing each other, as shown in FIG. 4. The magnet 64 is considerably larger and more powerful than the magnet 34, and is disposed in such proximity to the base of the tank 20 that when the fish 24 is near the base of the tank 20 the magnetic lines of force from the magnet 64 repel the magnetic lines of force of the magnet 34, so as to bring the fish 24 upwards from the bottom of the tank 20 in the direction of circular movement of the magnet 64 as it rotates on the arm 62.

In the operation of my invention, one or more fish 24, constructed as has been heretofore described, are inserted into the water of the tank 20, and the lid 20a sealed. The fish 24 fill with water but remain buoyant because of the air bulbs 28, and are stabilized by means of the fins 36, 38, 40 and 42, and the weight 44. The contrast of weight and air is such, however, that the fish 24 tend normally to settle to the bottom of the tank 20 in the absence of external stimuli. Upon the energizing of the motor 52, however, the magnet 64 is rotated clockwise below the tank 20. As the magnet 64 approaches the fish 24 the magnet 34 within the fish 24 is repelled by the magnet 64, causing the fish 24 to rise upward from the bottom of the tank 20 and forward in the direction of rotation of the approaching magnet 64. As the fish 24 rise the magnetic contact between magnets 34 and 64 is broken, and the fish 24, still moving clockwise around the perimeter of the tank 20, tend to settle again toward the bottom of the tank 20. As the fish 24 near the bottom of the tank 20, contact is again made with the rotating magnet 64, the renewed contact again driving the fish 24 upward and forward. In this continuous process the fish 24 "swim" around the perimeter of the tank 20 in a continually rising and falling altitude, simulating the actual swimming motions of living fish. This continues as long as the motor 52 is energized to rotate the magnet 64.

I have thus far restricted my description to a preferred embodiment of my invention. It is clearly apparent, however, that many modifications may be made within the spirit and scope of the invention. For example, rotation of the magnet 64 may be accomplished by a battery-activated motor, instead of a current source, and even by mechanical, instead of electrical, means. Further, instead of an imitation fish, the swimming object may be a sea horse or any of the other varieties of marine life. The "swimming" or rotating object may even be any kind of inanimate object or advertising material, constructed in the same manner for stability, buoyancy and movement. Also, for greater realism, the caudal fin 36 of the fish 24 may be constructed of a separate piece of material and mounted pivotally to the fish 24, so as to swing sidewise, thus giving greater realism to the display.

It is therefore clearly apparent that the embodiment thus shown and described is by way of illustration and not of limitation, and various changes may be made in the construction, composition and arrangement of parts without limitation upon or departure from the spirit and scope of the invention, or sacrificing any of the advantages thereof inherent therein, all of which are claimed.

Having described my invention, I claim:

1. An animated marine display comprising a liquid-filled, non-magnetic tank,
    a marine object in free suspension in the liquid, the object being provided with means for its stabilization and limited buoyancy,
    a bar magnet vertically disposed within the object and provided with magnetic poles at its vertical ends,
    a second bar magnet rotatably mounted beneath the tank base,
    the second magnet disposed vertically and provided with magnetic poles at its vertical ends,
    the two magnets disposed with like poles facing each other, with the second magnet spaced from the tank base so that its magnetic lines of force repel the magnetic lines of force of the first magnet when the object nears the tank base above the second magnet, and
    means to rotate the second magnet in a plane parallel to the plane of, upon an axis concentric with the axis of, the tank base.

2. An animated marine display comprising a liquid-filled, non-magnetic circular tank,
    a marine object in free suspension in the liquid, the object being provided with means for its stabilization and limited buoyancy,
    a bar magnet vertically disposed within the object and provided with magnetic poles at its vertical ends,
    a second bar magnet rotatably mounted beneath the tank base, the second magnet disposed vertically and provided with magnetic poles at its vertical ends,
    the two magnets disposed with like poles facing each other, with the second magnet spaced from the tank base so that its magnetic lines of force repel the magnetic lines of force of the first magnet when the object nears the tank base above the second magnet, and
    means to rotate the second magnet in a plane parallel to the plane of, upon an axis concentric with the axis of, the tank base.

References Cited by the Examiner

UNITED STATES PATENTS

| 2,703,469 | 3/1955 | Raizen | 46—92 |
| 2,770,073 | 11/1956 | Sullivan | 40—106.45 |
| 3,106,394 | 10/1963 | Gelbart | 40—326 X |

FOREIGN PATENTS 907,156   3/1954   Germany.

EUGENE R. CAPOZIO, Primary Examiner.

JEROME SCHNALL, Examiner.